June 2, 1925.
C. PRY
GAUGE COCK
Filed May 7, 1924
1,540,279
2 Sheets-Sheet 1
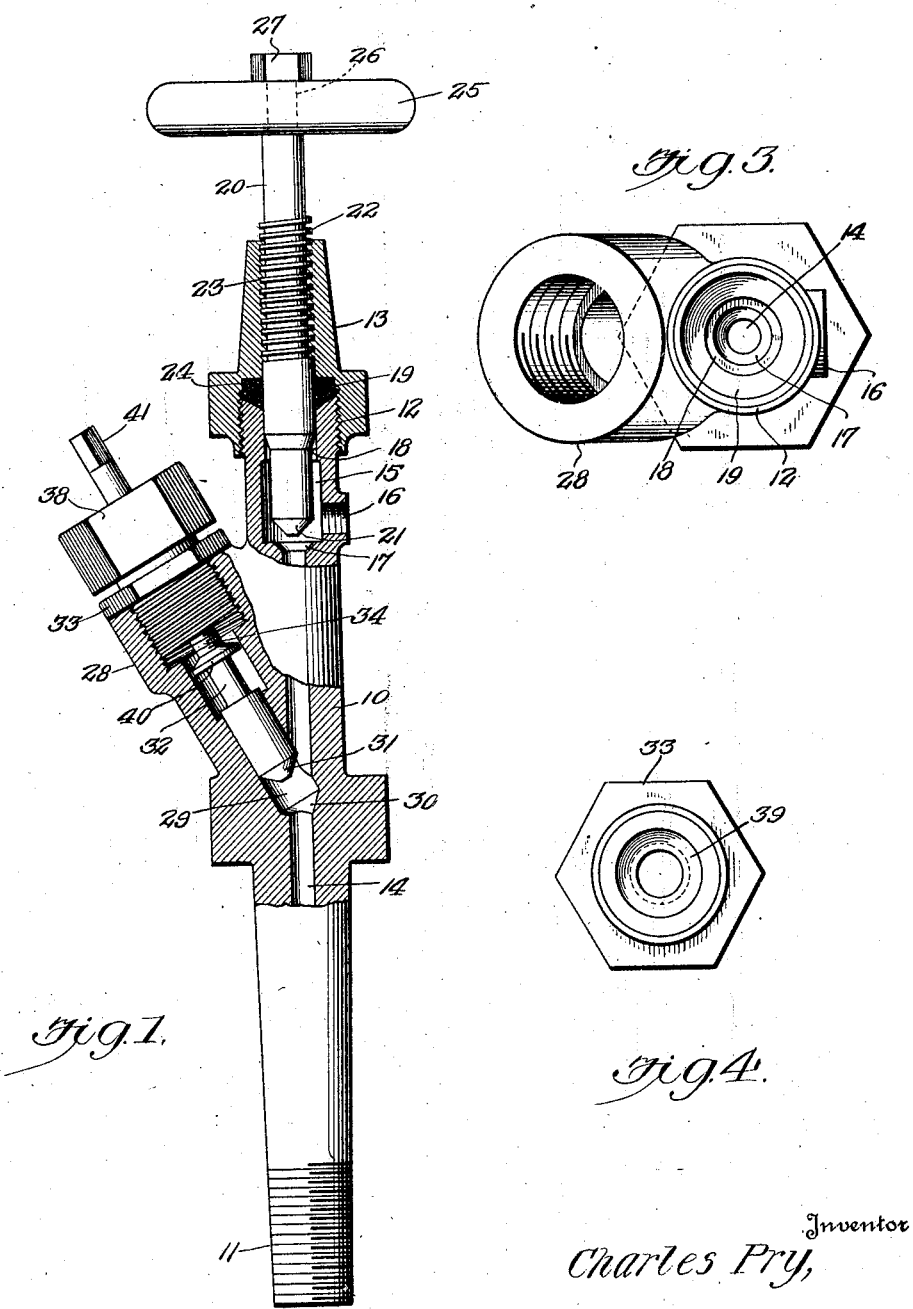
Inventor
Charles Pry,
By 
Attorney

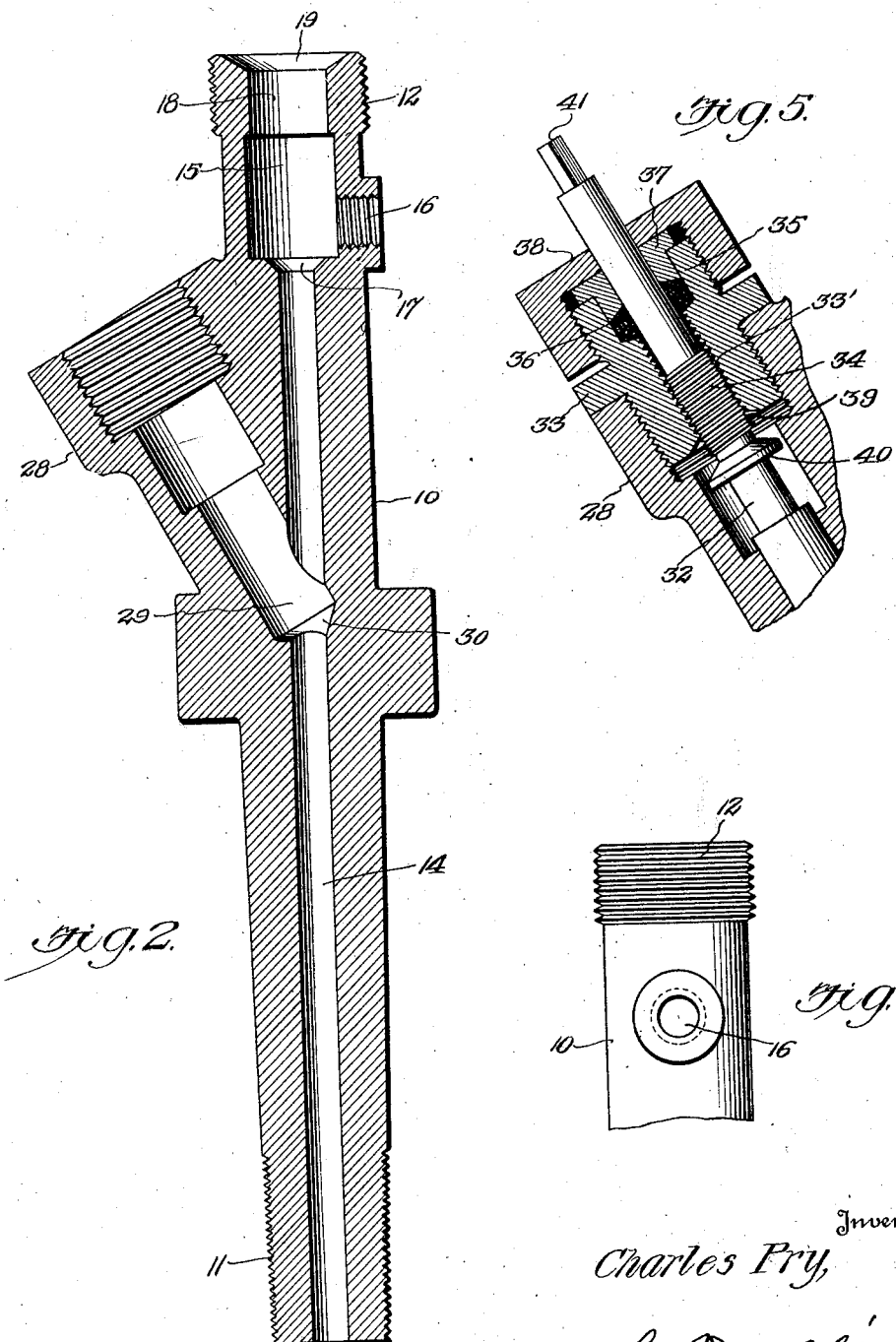

Patented June 2, 1925.

1,540,279

UNITED STATES PATENT OFFICE.

CHARLES PRY, OF PORTSMOUTH, OHIO.

GAUGE COCK.

Application filed May 7, 1924. Serial No. 711,650.

*To all whom it may concern:*

Be it known that I, CHARLES PRY, a citizen of the United States, residing at Portsmouth, in the county of Scioto and State of Ohio, have invented certain new and useful Improvements in Gauge Cocks, of which the following is a specification.

This invention has to do with gauge cocks of the type commonly used with steam boilers for testing the height of the water therein and an object of the invention is to provide an improved gauge cock with a shut-off valve which can be ground in under boiler pressure.

It is the further object of the invention to provide a gauge cock of a novel and simplified construction presenting certain advantages in point of use, facility of inspection, and the making of repairs, etc., not possessed by gauge cocks in present use. With this object in view therefore, the construction is such that not only can any part be taken off and replaced without discarding the gauge cock but there is provided, also, a clear channel to the boiler for purposes of Federal inspection, it being a common practice to run a rod through to the boiler when making such inspection.

In addition to the foregoing, the invention provides a gauge cock of the type referred to wherein means are provided to prevent the spindle of the shut-off valve from blowing out in packing under boiler pressure.

With the above and other objects in view, the invention resides in the construction, arrangement and combination of parts hereinafter described and pointed out with reference to the accompanying drawings, wherein:—

Figure 1 is a longitudinal sectional view of the assembled gauge cock.

Figure 2 is a sectional view of the gauge cock body.

Figure 3 is an end view thereof.

The remaining views are detail views.

Describing the invention in detail, 10 designates the body of the gauge cock which is preferably made of brass. The body is of slightly tapered formation and is provided with a thread 11 on one end for engagement in a correspondingly threaded orifice in the wall of the boiler to which the cock is applied. The other end of the body is threaded at 12 to engage the bonnet 13. Extending longitudinally of the body is a central bore or main water passage, 14, which terminates, adjacent the bonnet end of the body in an enlarged outlet chamber 15 having an outlet port 16. This outlet port may be threaded as shown to receive a plug or stopper when not in use. At the junction of the bore and the outlet chamber, a valve seat 17 is provided and beyond the bearing 18 for the main spindle valve, the end of the gauge cock body is provided with a concaved packing seat 19. The spindle 20 of the main valve is tapered at the end 21 to fit the valve seat 17 and is of the reciprocating screw-operated type, being provided with a screw 22 adapted to be engaged in the thread grooves 23 of the bonnet 13. As shown, in the assembled view, suitable packing 24 is confined between the bonnet and the packing seat 19 of the gauge cock body. Spindle 20 is turned for seating or unseating the valve 21 by means of a hand wheel 25 mounted on the squared end 26 of the spindle and locked in place thereon by nut 27.

The bonnet 28 of the shut-off valve is made in one piece with the gauge cock body 10, being offset and inclined to the axis of the latter so that the bore 29 of the shut-off valve intercepts the water passage 14 at an angle thereto, as illustrated. At the point of interception, the water passage is provided with a valve seat 30 against which is adapted to seat the tapered end 31 of the shut-off spindle valve 32. A bushing 33 screws into bonnet 28 and has a threaded opening 33' for engagement with the threads 34 of the spindle 32. Integral with bushing 33 is a cup-extension 35 and engaged therein is the packing 36 and the gland 37; the latter being secured by a packing nut 38 threadedly engaged with the said cup-extension, as shown. At its inner end, the bushing is provided with a seat 39 for seating the valve disk 40, of the shut-off valve spindle 32. It will thus be seen that spindle 32 has two seats. The purpose and advantage of this is to prevent any danger of the spindle blowing out in packing under boiler pressure. The spindle is turned to opened and closed positions by means of a special wrench applied to the squared end 41.

In the normal use of the device, the shut-off valve is usually left open so that when the water in the boiler reaches the level of the gauge cock, it enters the water passage 14 but is prevented from entering the outlet chamber 15 by reason of the valve 21 being closed. This valve is opened only when it is desired to test the level of the water in the boiler, to see if it has reached the height of the gauge cock, as no water will enter chamber 15 and escape through port 16, when valve 21 is open, unless it is at or above the level of the water passage 14. When it is desired to inspect or repair any part of the gauge cock valve, this can be done, without disconnecting the gauge cock from the boiler, by simply closing the shut-off valve 31, and thus closing further flow of water beyond the point indicated. Since all the parts of both valve assemblies are removable, it is apparent that any part can be taken off and replaced without discarding the gauge cock. Moreover, the straight bore 14 provides a clear channel to the boiler through which a rod may be run as required for Federal inspection and, it will be noted, the grouping and arrangement of the various parts of the device is such that the assembled gauge cock occupies a minimum of space, thereby further adapting it for use within the restricted space on the boiler head.

Having thus described the invention, what is claimed, is:—

A gauge cock comprising a valve casing having a main bore extending longitudinally therethrough, said main bore having a relatively large outer end and a relatively small inner end, said bore further having an intermediate portion between its inner and outer ends of greater diameter than the outer end, said bore further having a valve seat at the inner end of said intermediate portion, a bonnet having a threaded bore and being screwed on the outer end of the valve casing, a valve having a threaded stem screwed in said bonnet and provided with a portion adjacent the threads fitting the outer end of said bore, and a portion of less diameter moving in the intermediate portion of said bore and provided with frusto conical end to seat on said valve seat, said casing further having an auxiliary bore arranged at an acute angle with the first bore and intersecting the rear portion of said first bore intermediate its ends, said second bore having relatively large internally threaded outer end, a relatively small inner end and an intermediate portion having a diameter intermediate the diameters of the inner and outer ends, the inner end of the second bore being of greater diameter than the inner end of the first bore, a conical valve seat being formed at the intersection of the first and second bores, a threaded bonnet screwed into the outer end of the second bore, a threaded valve stem extending through said bonnet, a valve carried by the inner end of the last mentioned valve stem and having a cylindrical body fitting closely in the inner end of the second bore and provided with a frusto conical extremity adapted to seat on the second valve seat, and a flange on the second valve stem spaced from the body on said stem, said flange engaging against the second bonnet upon the valve being fully opened.

In testimony whereof I affix my signature.

CHARLES PRY.